(12) United States Patent
Brophy et al.

(10) Patent No.: US 6,212,528 B1
(45) Date of Patent: *Apr. 3, 2001

(54) CASE-BASED REASONING SYSTEM AND METHOD FOR SCORING CASES IN A CASE DATABASE

(75) Inventors: Gary R. Brophy, Byron, MN (US); Charles Song Yop Moon, Round Rock, TX (US); Thomas Alan Shore, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,022

(22) Filed: Sep. 10, 1999

Related U.S. Application Data

(63) Continuation of application No. 09/001,083, filed on Dec. 30, 1997.

(51) Int. Cl.[7] .................................................. G06F 17/00
(52) U.S. Cl. .................... 707/103; 707/1; 707/3; 707/6; 707/10; 707/102
(58) Field of Search ................................... 707/1, 3, 5, 6, 707/10, 102, 103, 104, 500; 395/750.05

(56) References Cited

U.S. PATENT DOCUMENTS

| | | | |
|---|---|---|---|
| 5,581,664 | * 12/1996 | Allen et al. ............................ 395/51 |
| 5,689,716 | * 11/1997 | Chen .................................... 707/500 |
| 5,717,914 | * 2/1998 | Husick et al. ............................ 707/5 |
| 5,737,734 | * 4/1998 | Schultz .................................... 707/5 |
| 5,742,816 | * 4/1998 | Barr et al. ............................ 707/104 |
| 5,742,833 | * 4/1998 | Dea et al. ........................ 395/750.05 |
| 5,832,500 | * 11/1998 | Burrows ............................... 707/103 |
| 5,845,278 | * 12/1998 | Kirsch et al. ............................ 707/3 |
| 5,893,095 | * 4/1999 | Jain et al. ............................... 707/6 |
| 5,903,892 | * 5/1999 | Hoffert et al. ......................... 707/10 |
| 5,924,090 | * 7/1999 | Krellenstein ............................. 707/5 |
| 5,930,783 | * 8/1999 | Li et al. .................................... 707/1 |
| 5,933,822 | * 8/1999 | Braden-Harder et al. ............... 707/5 |
| 6,021,411 | * 2/2000 | Brophy et al. ......................... 707/103 |

\* cited by examiner

*Primary Examiner*—Wayne Amsbury
*Assistant Examiner*—Thuy Pardo
(74) *Attorney, Agent, or Firm*—A. Pete Tennent; Felsman, Bradley, Vaden, Gunter & Dillon, LLP

(57) ABSTRACT

A case-based reasoning system is disclosed that includes a case database and a search engine. The case database is capable of storing a plurality of cases that each include one or more attributes that each have an associated match weight. Match weights of attributes in different cases are separately specified. In response to receipt of an incident including one or more input terms, the search engine scores the relative closeness of a selected case to the incident utilizing the match weights of attributes in the selected case that match input terms in the incident.

24 Claims, 3 Drawing Sheets

12

| | | 1 | 2 | 3 | 4 | | M |
|---|---|---|---|---|---|---|---|
| CASE 1 WEIGHT & SCORING INFO | CASE 1 | P1/V1 | P2/V2 | P3/V3 | | | |
| CASE 2 WEIGHT & SCORING INFO | CASE 2 | P1/V1 | P4/V4 | P5/V5 | P6/V6 | • • • | PM/V9 |
| CASE 3 WEIGHT & SCORING INFO | CASE 3 | P7/V1 | P8/V1 | P9/V1 | | | |
| • • • | | | | • • • | | | |
| CASE N WEIGHT & SCORING INFO | CASE N | P1/V2 | P2/V2 | P4/V1 | P10/V10 | • • • | |

Fig. 2

| | 1 | 2 | 3 | 4 | ... | M |
|---|---|---|---|---|---|---|
| CASE 1 | P1/V1 | P2/V2 | P3/V3 | | | |
| CASE 2 | P1/V1 | P4/V4 | P5/V5 | P6/V6 | | PM/V9 |
| CASE 3 | P7/V1 | P8/V1 | P9/V1 | | | |
| ... | | | ... | | | |
| CASE N | P1/V2 | P2/V2 | P4/V1 | P10/V10 | | |

12

| CASE 1 WEIGHT & SCORING INFO |
| CASE 2 WEIGHT & SCORING INFO |
| CASE 3 WEIGHT & SCORING INFO |
| ... |
| CASE N WEIGHT & SCORING INFO |

CASE-BASED REASONING SYSTEM AND METHOD FOR SCORING CASES IN A CASE DATABASE

This application is a continuation of application Ser. No. 09/001,083, filed Dec. 30, 1997.

BACKGROUND OF THE INVENTION

1. Technical Field

The present invention relates in general to expert systems and, in particular, to case-based reasoning systems. Still more particularly, the present invention relates to a case-based reasoning system and method of scoring cases in a case database.

2. Description of the Related Art

A case-based reasoning (CBR) system generally refers to a computer system that identifies a solution to a current problem by examining descriptions of similar, previously encountered problems and their associated solutions, matching the current problem with one or more similar previously encountered problems, and using the associated solutions of the matching previously encountered problems to suggest a solution to the current problem. In response to receipt of a description of a current problem, a conventional CBR system retrieves the closest matching cases from a case database using a search engine and iteratively prompts the user for additional descriptive information until the retrieved case or cases identified by the search engine are sufficiently similar to the current problem to be considered as possible solutions. If a new solution (not previously stored in the case database) is subsequently validated, the validated solution can be entered into the case database and utilized to solve future problems.

Of course, the quality of solutions produced by a CBR system will depend, in part, upon the method utilized by the search engine to determine the best matching case in the case database. Conventional case-based reasoning systems assign scores to each case in the case database and select the highest scoring case as the best matching case. Current scoring methods tend to be complex, however, resulting in poor system performance, particularly when the case database contains a large number of cases or cases having a large number of attributes.

As should thus be apparent, it would be desirable from a performance standpoint to provide an improved method and system for scoring cases in the case database of a CBR system.

SUMMARY OF THE INVENTION

It is therefore one object of the present invention to provide an improved expert system.

It is another object of the present invention to provide an improved case-based reasoning system.

It is yet another object of the present invention to provide an improved case-based reasoning system and method of scoring cases in a case database.

The foregoing objects are achieved as is now described. A case-based reasoning system is provided that includes a case database and a search engine. The case database is capable of storing a plurality of cases that each include one or more attributes that each have an associated match weight. Match weights of attributes in different cases are separately specified. In response to receipt of an incident including one or more input terms, the search engine scores the relative closeness of a selected case to the incident utilizing the match weights of attributes in the selected case that match input terms in the incident.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 illustrates a more detailed representation of the contents of a case base in an illustrative embodiment of the present invention.

DETAILED DESCRIPTION OF ILLUSTRATIVE EMBODIMENT

Figure 1:
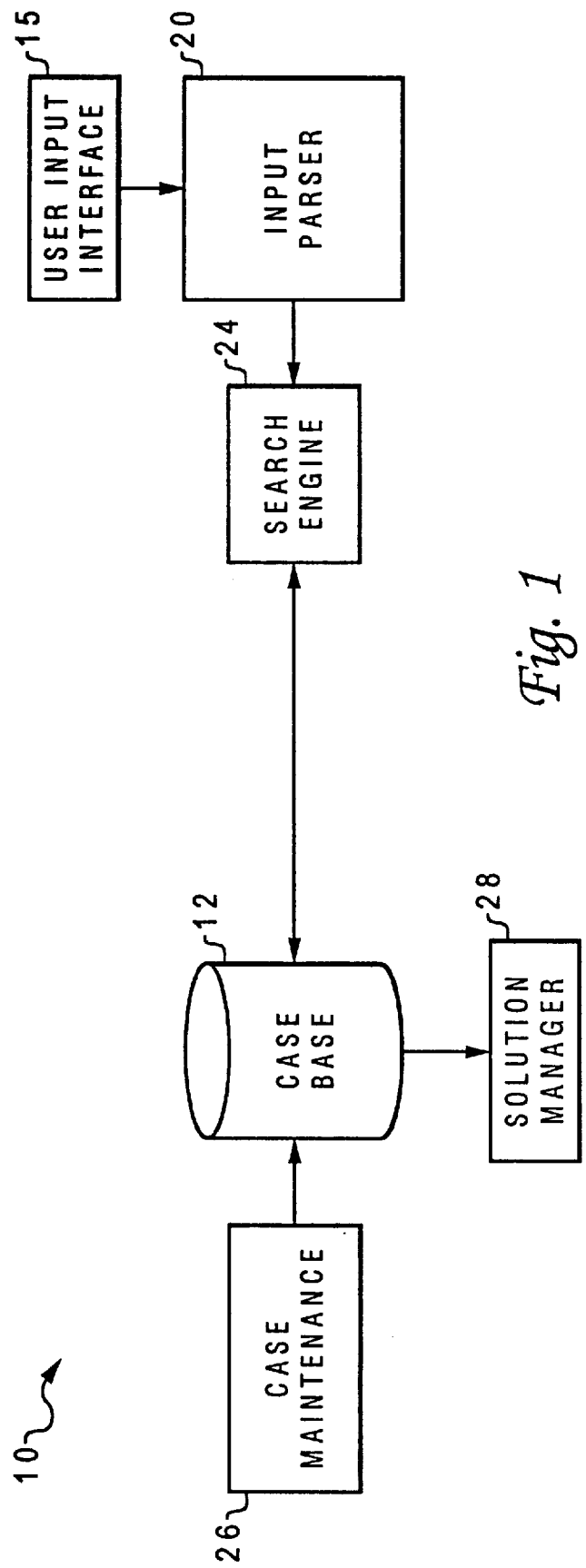
FIG. 1 depicts an illustrative embodiment of a case-based reasoning (CBR) system in accordance with the present invention.

With reference now to the figures and in particular with reference to FIG. 1, there is depicted an illustrative embodiment of a case-based reasoning (CBR) system in accordance with the present invention. As illustrated, CBR system 10 includes case base 12, which is a database for storing attributes of experiences called cases. The cases collected in case base 12 can be gathered from any endeavor in which solutions to current problems or proposed actions can be determined from relevant experience in similar past situations. Thus, the cases stored within case base 12 can relate, for example, to help desk support, sales support, customer service, medical diagnosis, engineering design, executive information systems, or the like. The cases stored within case base 12 can be organized and indexed in a number of different ways, depending upon on the type of attributes utilized to describe the cases and the logical relationship between different cases. For example, one approach is to store cases in case base 12 in a tree data structure constructed utilizing an inductive algorithm. Another conventional approach called "nearest neighbor indexing" uses developer-specified values for each attribute of each case and then calculates the degree of closeness between cases using formulas for each stored case. A third approach is to utilize a hierarchy tree of prototype cases. According to this method, a root case class is defined, and then multiple layers of abstract classes are constructed between the root case class and specific instances of cases. Finally, a method called "knowledge-guided indexing" can be employed to create subsets of cases based upon rules of reason implemented by a rule inference engine. Those skilled in the art will recognize that different schemes of case base organization may be more advantageous than others depending upon the type of cases stored in case base 12 and the capabilities of the available software tools.

Regardless of how it is physically organized, case base 12 can be viewed as a multi-dimensional database array, where each case forms a record and each case attribute is a field within a record. Such a view is illustrated in FIG. 2. As shown in FIG. 2, case base 12 stores N cases, which can each include up to M attributes. In some embodiments of case base 12, each attribute is described by a single term. However, as shown in FIG. 2, alternative embodiments describe each attribute with a property type-property value pair, where the property type corresponds to a category or question related to an experience, and the property value provides the experience's value for that property type or the answer to the question represented by the property type. As illustrated in FIG. 2, each of the N cases in case base 12 is permitted to have a varying number of different, unordered properties, which can each have one or more associated values. In association with each of the N cases, case base 12 stores weight and scoring information that is utilized to determine the closeness of cases to an input case or "incident."

Returning to FIG. 1, CBR system 10 includes a user input interface 15 that permits a user to enter a description of an incident. User input interface can comprise, for example, a graphical user interface, a conventional structured query language (SQL) interface, or a textual interface that requests user inputs in response to a series of menus or questions. Inputs received by user input interface 15 are passed to input parser 20, which parses the user's description of the incident into a predetermined format. The parsed user input produced by input parser 20 is passed to search engine 24.

Search engine 24 compares the parsed user input with each case in case base 12, assigning each case a score that provides a measure of closeness between the case and the incident. The case IDs of the best matching case or cases in case base 12, as determined by the score assigned to each case by search engine 24, are passed to case base 12, which outputs the identified case or cases to solution manager 28 for processing. At this point solution manager 28 may prompt the user for additional input if the scores of the output cases indicate that none of the output cases was sufficiently close to the incident or if an insufficient number of substantially close cases were located. Utilizing the additional user inputs, a refined search of case base 12 can be performed. If at the conclusion of the initial search and any additional refined searches a determination is made that no cases in case base 12 closely match the incident, case maintenance mechanism 26 will correctly format the incident and any resolution provided and add the incident to case base 12. However, in response to a determination that one or more best matching cases were identified by search engine 24, solution manager 28 presents the best matching case or cases to the user as a solution or proposed action to be taken.

In accordance with the present invention, CBR system 10 scores the closeness of cases in case base 12 to the incident utilizing a selected scoring method. Depending upon implementation, the scoring method utilized to score each case can be specified by the user, determined automatically in response to the format of the attributes that describe the cases in case base 12, or alternatively, stored in case base 12 in association with each case as part of the weight and scoring information. In certain situations, it may be desirable to employ multiple scoring methods in combination to verify the identification of the best matching case.

A first scoring method that can be utilized by CBR system 10 is the "descriptive match" scoring method. The descriptive match scoring method is preferably utilized to evaluate the closeness of cases having attributes that each include one or more descriptive terms that can be either a word (e.g., "green") or a value (e.g., "1F") and in situations in which partial matching is permitted. A preferred formula for performing a descriptive match can be given as:

$$Ds = ((Wm * Cm) + (Wa * Ca))/(Ct * Wm)$$

where $Ds$ is the overall score for a case, $Wm$ is a match weight for each term in the case description that matches an input term, $Cm$ is the number of input terms having a matching term in the case description, $Wa$ is a weight associated with each input term that has no corresponding term in the case description, $Ca$ is the number of input terms that have no corresponding term in the case description plus the number of terms in the case description that have no corresponding input term, and $Ct$ is the total number of input terms. $Wm$ is typically set to a value of 10, while $Wa$ is typically set to a value between 0 and −5 inclusively. Table I sets forth an exemplary case base 12 and the results of performing a descriptive match of the input incident "AA BB" utilizing two different values of $Wa$.

TABLE I

| case no. | case terms | raw score (Wm = 10 & Wa = −1) | adj. score | raw score (Wm = 10 & Wa = −5) | adj. score |
| --- | --- | --- | --- | --- | --- |
| 1 | AA | 9/20 = .45 | .725 | 5/20 = .25 | .625 |
| 2 | AA BB | 20/20 = 1.0 | 1.0 | 20/20 = 1.0 | 1.0 |
| 3 | AA CC | 8/20 = 0.4 | .70 | 0/20 = 0.0 | .5 |
| 4 | AA BB CC | 19/20 = .95 | .975 | 15/20 = .75 | .875 |
| 5 | AA BB CC DD | 18/20 = .90 | .95 | 10/20 = .50 | .75 |
| 6 | CC | −3/20 = −.15 | .425 | −15/20 = −.75 | .125 |

As shown in Table I, cases scored by the descriptive matching equation set forth above can attain a maximum score of 1.0, which represents an exact match. To eliminate negative scores while retaining relative score ordering, the raw scores can be normalized according to the equation $(Ds+1)/2$ to obtain an adjusted score. As an exact match, case 2 is clearly the best matching case, and case 4 is the next best match since it has the next closest score to 1.0.

A second method of scoring in accordance with the present invention is called System Reference Code (SRC) matching because of its utility in matching computer-generated failure codes (which are generally hexadecimal strings) with proposed failure solutions. SRC matching assigns a maximum score to any case that is a subset or superset (but not disjoint set) of the incident. An equation that implements SRC matching has the same general format as the equation for descriptive matching:

$$Ss = ((Wm * Cm) + (Wa * Ca))/(Ct * Wm)$$

where $Ss$ is the overall score for a case according to the SRC scoring method, $Wm$ is a match weight for each case attribute having a matching input term, $Cm$ is the number of input terms having a matching case attribute, $Wa$ and $Ca$ are both set to 0, and $Ct$ is the number of terms/attributes in either the case or the incident, whichever is smaller. As above, $Wm$ is typically set to a value of 10. Like the descriptive match scoring method, the SRC scoring method is preferably utilized when searching case bases in which attributes each contain one or more terms and in situations in which partial matching is permitted. Table II contains the results of performing a SRC match of the input incident "AA BB" within the same exemplary case base 12 used in Table

TABLE II

| case no. | case terms | score (Wm = 10 & Wa = 0) |
|---|---|---|
| 1 | AA | 10/10 = 1.0 |
| 2 | AA BB | 20/20 = 1.0 |
| 3 | AA CC | 10/20 = 0.5 |
| 4 | AA BB CC | 20/20 = 1.0 |
| 5 | AA BB CC DD | 20/20 = 1.0 |
| 6 | CC | 0/10 = 0.0 |

A third type of matching supported by CBR system 10 in accordance with the present invention is property matching. Property matching can be employed when searching a case base in which case attributes are represented as property type-property value pairs, as shown in FIG. 2. An equation that may be used to generate a property match score for a case is as follows:

$$Ps = (\Sigma_1(Wm * Pm) + \Sigma_2(Wu * Pu) + \Sigma_3(Wa * Pa))/\Sigma_4(Wmt * Pt)$$

where Ps is the total score for the case according to the property matching scoring method, $\Sigma_1$ is a summation performed over all tributes in the case that match both a property type and associated property value in the incident, $\Sigma_2$ is a summation performed over all property values in the case that have an associated property type that matches an incident property type and that do not match the associated incident value, $\Sigma_3$ is a summation performed over all incident property types having no match in the case, $\Sigma_4$ is a summation over all attributes in the case, Wm is the match weight associated with an attribute in the case, Pm is a percent contribution term for the matching attribute, Wu is a mismatch weight associated with a particular property value in the case, Pu is a percent contribution term for the mismatching property value in the case, Wa is an absent weight associated with a particular incident property type, Pa is a global absent term percent contribution applicable to all incident property types, Wmt is the maximum weight of each attribute in the case, and Pt is the percent contribution of each attribute in the case. Table III contains an exemplary case base 12 and the raw and adjusted scores of each case when performing property matching utilizing the incident "A1 B1." In the example given in Table III, Pm is set to normal for all cases (i.e., all attributes in a case have an equal percent contribution), and adjusted scores are computed from raw scores according to the equation (Ps+1)/2.

TABLE III

| case no. | case terms | raw score (Wm = 10, Wu = −5, & Wa = −1) | adj. score |
|---|---|---|---|
| 1 | A1 | 9/10 = .90 | .95 |
| 2 | A1 B1 | 20/20 = 1.0 | 1.0 |
| 3 | A1 B0 | 5/20 = 0.25 | .625 |
| 4 | A0 B0 | −10/20 = −0.5 | .25 |
| 5 | A1 B1 C1 | 20/30 = 0.6 | .83 |
| 6 | A1 B0 C1 | 5/30 = .16 | .58 |
| 7 | A1 C1 | 9/20 = .45 | .724 |

According to the property scoring equation set forth above, the highest scores are received by the cases that best match the incident. Thus, as an exact match, case 2 receives the highest score, and case 1 receives the second highest score as the next best match. Preferably, user-defined inputs will be utilized to establish threshold and maximum value parameters that respectively determine the lowest permissible closely matching score and the maximum number of top scoring cases to be identified as possible solutions.

Figure 3:
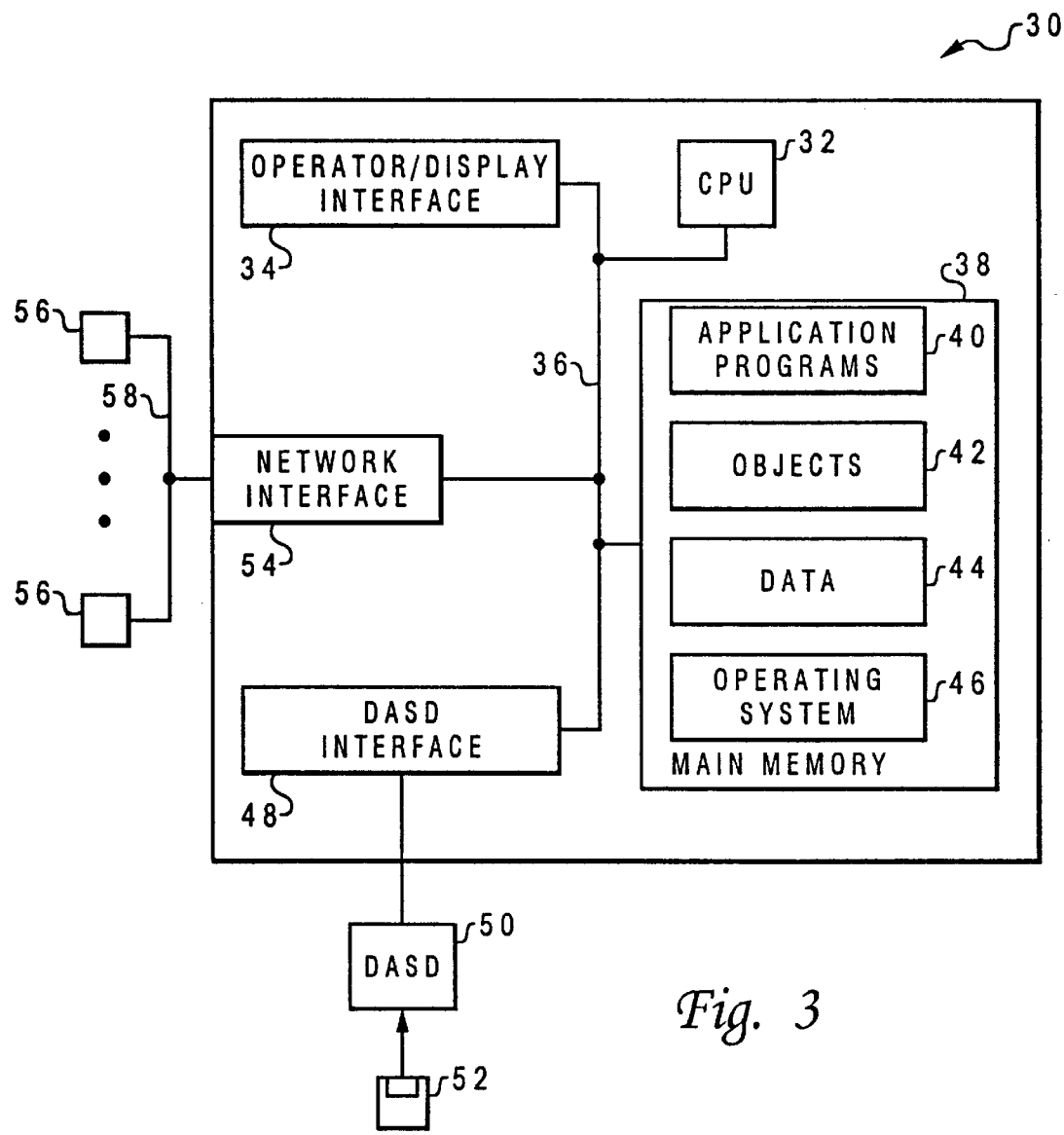
FIG. 3 depicts an illustrative embodiment of a data processing system that may be utilized to implement a CBR system in accordance with the present invention.

CBR system 10 can be implemented within a number of diverse data processing systems utilizing a combination of hardware and software. A high level block diagram of an exemplary data processing system that may be utilized to implement CBR system 10 is depicted in FIG. 3. As illustrated in FIG. 3, computer system 30 includes at least one central processing unit (CPU) 32 that operates in response to operator commands and data, which CPU 32 receives from an operator/display interface 34 to which CPU 32 is connected by system bus 36. CPU 32 can also receive operator commands and data from main memory 38, which is also coupled to CPU by system bus 36. Although main memory 38 is represented as a single entity, those skilled in the art will appreciate that main memory 38 can comprise a combination of random access memory (RAM), hard disk drives, optical disk drives, and other storage devices containing logically segmented storage locations.

Main memory 38 contains a variety of data structures, including application programs 40, objects 42, data 44, and operating system 46. Operating system 46 preferably supports an object oriented programming environment such as provided, for example, by the C++ programming language. Application programs 40 are invoked, or launched, by a user through operator/display interface 34. Application programs 40, which can include portions of CBR system 10, can be written in a variety of procedural or object oriented programming languages, including C++. Objects 42 are programming data structures of an object oriented programming language, such as C++.

Computer system 30 also includes a direct access storage device (DASD) interface 48 that is connected to system bus 36 and is also connected to DASD 50. Those skilled in the art will appreciate that DASD 50 can receive and read computer program products 52 from, for example, integrated circuit chips, and also machine-readable storage devices such as magnetic media disks, on which are recorded program instructions whose execution implements CBR system 10. The machine-readable storage devices also can comprise, for example, optical disks. Computer system 30 also includes a network interface 54 that permits communication between CPU 32 and other computer systems 56 over a network 58. Computer systems 56 can comprise, for example, computer systems similar in construction to exemplary computer system 30. In that way, computer system 30 can receive data into main memory 38 over network 58 after communication between the computer systems has been established by well-known methods that will understood by those skilled in the art without further explanation.

It is important to note that, while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal-bearing media used to actually carry out the distribution. Examples of signal-bearing media include recordable-type media such as floppy disks and optical disks and transmission-type media such as digital and analog communication links.

As has been described, the present invention provides an improved CER system that can utilize one or more selected scoring methods to identify the closest matching case in a case base. A scoring equation in accordance with the present invention can include weights for matching terms, mismatching terms, and weights for terms in the incident that are absent from the scored case. Because weights can be assigned term by term, case by case, or globally for all cases, the present invention permits great flexibility in tuning the operation of the case base search engine.

While the invention has been particularly shown and described with reference to a preferred embodiment, it will be understood by those skilled in the art that various changes in form and detail may be made therein without departing from the spirit and scope of the invention.

What is claimed is:

1. A case-based reasoning system, comprising:
    a case base storing a plurality of cases that each include one or more attributes, each of said attributes having a respective match weight associated therewith, wherein match weights of attributes in different cases are separately specified, said plurality of cases including a selected case; and
    a search engine that, in response to receipt of an incident including one or more input terms that each have a respective non-zero absent weight associated therewith, determines a score indicating the relative closeness of said selected case to said incident, wherein said search engine determines the score of said selected case utilizing the match weights of attributes in said selected case that match input terms in said incident and utilizing the absent weight of each input term in the incident having no matching attribute in said selected case.

2. The case-based reasoning system of claim 1, wherein said absent weights are user-specified.

3. The case-based reasoning system of claim 1, each of said attributes comprising a property having a value associated therewith, said match weights being associated with properties of said attributes, each value having a mismatch weight associated therewith, wherein said search engine scores the relative closeness of said selected case to said incident utilizing the mismatch weight of each value for which the associated property has a matching input term and the value itself has no matching input term.

4. A The case-based reasoning system of claim 3, each of said match weights and mismatch weights having a contribution factor associated therewith, wherein said search engine scales match weights and mismatch weights utilized in scoring said selected case by multiplying said match weights and mismatch weights by their respective contribution factors.

5. The case-based reasoning system of claim 1, each of said attributes containing one or more terms that each have an absent weight associated therewith, wherein said search engine scores the relative closeness of said selected case to said incident utilizing the absent weight of each term in said selected case having no matching input term in said incident.

6. The case-based reasoning system of claim 1, wherein said search engine scores a plurality of cases including said selected case and outputs a best scoring case as a best match for said incident.

7. The case-based reasoning system of claim 1, wherein said match weights are user-specified.

8. The case-based reasoning system of claim 1, wherein said match weights are individually specified for each attribute in said selected case.

9. A method of case-based reasoning, said method comprising:
    storing a plurality of cases including a selected case in a case base, wherein said plurality of cases each include one or more attributes:
    associating a respective match weight with each attribute, wherein match weights of attributes in different cases are separately specified; and
    in response to receipt of an incident including one or more input terms that each have a respective non-zero absent weight associated therewith, determining a score indicating the relative closeness of said selected case to said incident utilizing the match weights of attributes in said selected case that match input terms in said incident and utilizing the absent weight of each input term in the incident having no matching attribute in said selected case.

10. The method of claim 9, said scoring step comprising scoring the relative closeness of said case using user-specified absent weights.

11. The method of claim 9, each of said attributes comprising a property having a value associated therewith, said match weights being associated with properties of said attributes, each value having a mismatch weight associated therewith, wherein said scoring step comprises scoring the relative closeness of said selected case to said incident utilizing the mismatch weight of each value for which the associated property has a matching input term and the value itself has no matching input term.

12. The method of claim 11, each of said match weights and mismatch weights having a contribution factor associated therewith, wherein said scoring step includes scaling match weights and mismatch weights utilized in scoring said selected case by multiplying said match weights and mismatch weights by their respective contribution factors.

13. The method of claim 9, each of said attributes containing one or more terms that each have an absent weight associated therewith, wherein said scoring step further comprises scoring the relative closeness of said selected case to said incident utilizing the absent weight of each term in said selected case having no matching input term in said incident.

14. The method of claim 9, wherein said scoring step comprises scoring said plurality of cases and outputting a best scoring case as a best match for said incident.

15. The method of claim 9, wherein said associating step is performed in response to entry of user-specified match weights.

16. The method of claim 9, wherein said associating step comprises associating individually specified match weights with attributes in said selected case.

17. A program product for causing a computer system to implement a method of case-based reasoning, said program product being embodied in a signal-bearing medium and comprising:
    program code means for causing said computer system to store a plurality of cases including a selected case in a case base, wherein said plurality of cases each include one or more attributes:

program code means for causing said computer system to associate a respective match weight with each attribute, wherein match weights of attributes in different cases are separately specified; and program code means, responsive to receipt of an incident including one or more input terms that each have a respective non-zero absent weight associated therewith, for causing said computer system to determine a score indicating the relative closeness of said selected case to said incident utilizing the match weights of attributes in said selected case that match input terms in said incident and utilizing the absent weight of each input term in the incident having no matching attribute in said selected case.

18. The program product of claim 17, said program code mans for causing said computer system to score comprising program code means for causing said computer system to score the relative closeness of said case using user-specified absent weights.

19. The program product of claim 17, each of said attributes comprising a property having a value associated therewith, said match weights being associated with properties of said attributes, each value having a mismatch weight associated therewith, wherein said program code means for causing said computer system to score comprises program code means for causing said computer system to score the relative closeness of said selected case to said incident utilizing the mismatch weight of each value for which the associated property has a matching input term and the value itself has no matching input term.

20. The program product of claim 19, each of said match weights and mismatch weights having a contribution factor associated therewith, wherein said program code means for causing said computer system to score includes program code means for causing said computer system to scale match weights and mismatch weights utilized in scoring said selected case by multiplying said match weights and mismatch weights by their respective contribution factors.

21. The program product of claim 17, each of said attributes containing one or more terms that each have an absent weight associated therewith, wherein said program code means for causing said computer system to score further comprises program code means for causing said computer system to score the relative closeness of said selected case to said incident utilizing the absent weight of each term in said selected case having no matching input term in said incident.

22. The program product of claim 17, wherein said program code means for causing said computer system to score comprises program code means for causing said computer system to score said plurality of cases and output a best scoring case as a best match for said incident.

23. The program product of claim 17, wherein said program code means for causing said computer system to associate performs said association in response to entry of user-specified match weights.

24. The program product of claim 17, wherein said program code means for causing said computer system to associate comprises program code means for causing said computer system to associate individually specified match weights with attributes in said selected case.

* * * * *